J. FORTENBACH.
DIES FOR MAKING WATCH-CASE CENTERS.

No. 185,174. Patented Dec. 12, 1876.

Witnesses:
James H. Hunter
A. Newell

Inventor:
Joseph Fortenbach

2 Sheets—Sheet 2.

J. FORTENBACH.
DIES FOR MAKING WATCH-CASE CENTERS.

No. 185,174. Patented Dec. 12, 1876.

Witnesses
K. Sewell
James H. Hunter

Inventor
Joseph Fortenbach

THE GRAPHIC CO. N.Y.

UNITED STATES PATENT OFFICE.

JOSEPH FORTENBACH, OF CARLSTADT, NEW JERSEY.

IMPROVEMENT IN DIES FOR MAKING WATCH-CASE CENTERS.

Specification forming part of Letters Patent No. 185,174, dated December 12, 1876; application filed May 7, 1875.

*To all whom it may concern:*

Be it known that I, JOSEPH FORTENBACH, of Carlstadt, Bergen county, in the State of New Jersey, have invented certain new and useful Improvement in the Manufacture of Watch-Case Centers, of which the following is a full, clear, and exact description, reference being had to the drawings forming a part of this specification.

Watch-cases have heretofore been made in the following manner: The metal was first cast into bars. Bezels and centers were then drawn from the bars by a draw-bench through a draw-plate or dies, then cut off in suitable lengths, soldered, and swaged down to a suitable shape and size. For the backs and caps, plates were rolled out through rollers to the required thickness, cut in shape with shears, and swaged up by followers, made usually of brass or composition. Snaps were then soldered on, and the pieces finished up in lathes, and the required form given to them by means of gravers and different other and well-known tools.

By my improvements I am enabled to manufacture a watch-case without the necessity of first drawing any of the parts from bars, and then soldering the ends of the sections cut therefrom, or of making the snaps separate from such parts, and subsequently uniting them by means of solder.

By such improvements all the parts referred to are formed up by means of a series of dies, the centers containing shoulders for bezels and caps, back and front backs, the bezels to their proper shape, and the covers containing snaps formed solidly thereto, thereby avoiding the necessity of solder and much manual labor in the attachment of such snaps.

Figure 1:
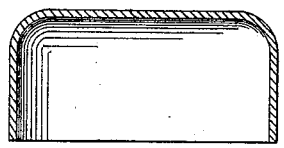
Figure 6:
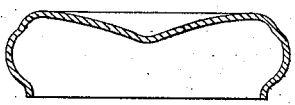
Figure 9:
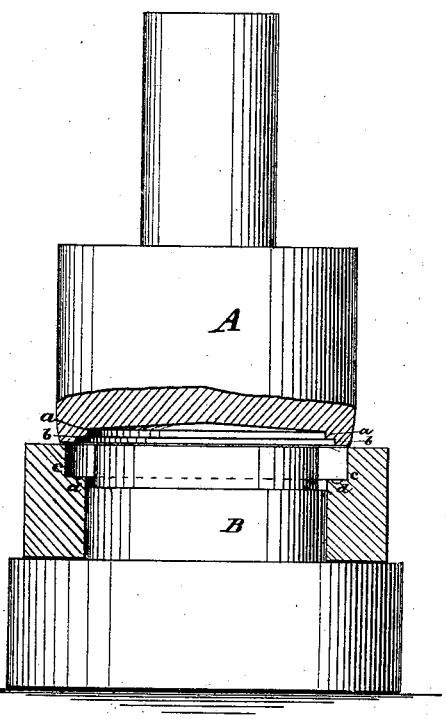
Figure 2:
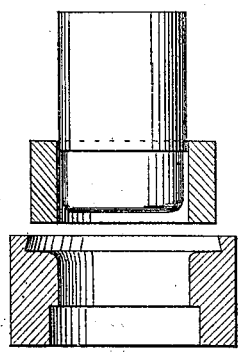
Figure 3:
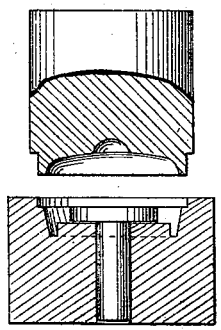
Figure 5:
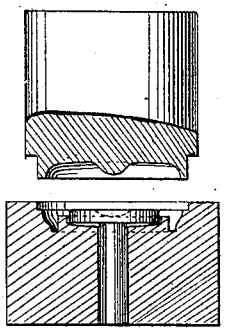
Figure 4:
Figure 7:
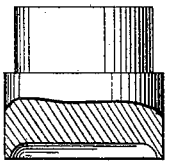
Figure 8:
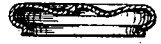

To make the center which is the subject-matter of the present application, a blank cut from the rolled metal is formed up into a cup shape, like Fig. 1, by the dies of a double-action press, the construction of which dies is shown in Fig. 2. This cup is then placed in dies, which are shown in Fig. 3, where it gets the shape seen in Fig. 4. It is then placed in dies, which are shown in Fig. 5, where it gets the shape seen in Fig. 6. It is then placed in the double lower and upper dies, which are shown in Fig. 7, where it gets the shape seen in Fig. 8. It is then placed in the same double lower die and an upper die, as shown in Fig. 9, when it gets the flattened shape on top, as seen in Fig. 10.

Figure 10:

These last dies give the piece shoulders on one side for the bezel and front back, and on the other side for the caps and back back, as seen in Fig. 10. These dies are new, and their operation will be understood from an inspection of the drawings. *a b* on the upper die and *c d* on the lower die are recesses, by means of which the center receives the shoulders referred to.

Figure 12:
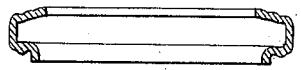
Figure 13:
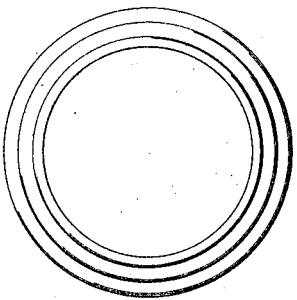
Figure 11:

After the piece comes out of these dies it is put into dies shown in Fig. 11, and a round plate cut out of the rear, thus making the piece the center of a watch-case, and suitable for receiving the movement, such center being a solid piece, without seam or joints, as shown in Figs. 12 and 13.

I claim—

1. The combination of the dies, Figs. 2, 3, 5, 7, 9, and 11, substantially as and for the purpose described.

2. The dies shown in Fig. 5, substantially as described.

3. The dies shown in Fig. 7, substantially as described.

4. The dies shown in Fig. 9, substantially as described.

JOSEPH FORTENBACH.

Witnesses:
 JAMES H. HUNTER,
 K. NEWELL.